(12) United States Patent
Zhong et al.

(10) Patent No.: US 9,563,024 B2
(45) Date of Patent: Feb. 7, 2017

(54) HIGH-DENSITY FIBER CONNECTOR WITH FRONT CASING DEFINING ENGAGEMENT RECESS AND REAR CASING INCLUDING HOOK ENGAGING WITH EACH OTHER

(71) Applicant: SUNSEA TELECOMMUNICATIONS CO.,Ltd., Shenzhen, Guangdong (CN)

(72) Inventors: ZhiYun Zhong, Guangdong (CN); Guo Yang, Guangdong (CN); QiYue Wang, Guangdong (CN)

(73) Assignee: Sunsea Telecommunications Co., Ltd., Shenzhen (CN)

( * ) Notice: Subject to any disclaimer, the term of this patent is extended or adjusted under 35 U.S.C. 154(b) by 106 days.

(21) Appl. No.: 14/313,161

(22) Filed: Jun. 24, 2014

(65) Prior Publication Data

US 2014/0308011 A1    Oct. 16, 2014

Related U.S. Application Data

(63) Continuation of application No. PCT/CN2012/071770, filed on Feb. 29, 2012.

(30) Foreign Application Priority Data

Feb. 27, 2012  (CN) .......................... 2012 1 0045948

(51) Int. Cl.
*G02B 6/38*    (2006.01)
(52) U.S. Cl.
CPC ............. *G02B 6/381* (2013.01); *G02B 6/3821* (2013.01); *G02B 6/3879* (2013.01); *G02B 6/387* (2013.01);
(Continued)

(58) Field of Classification Search
CPC ..... G02B 6/3879; G02B 6/3821; G02B 6/387; G02B 6/389; G02B 6/381; Y10T 29/4995; Y10T 29/49927
(Continued)

(56) References Cited

U.S. PATENT DOCUMENTS 4,762,389 A * 8/1988 Kaihara ............... G02B 6/3825
                                                     385/59
5,101,463 A * 3/1992 Cubukciyan ......... G02B 6/3831
                                                     385/69
(Continued)

FOREIGN PATENT DOCUMENTS

CN        1121180 A     4/1996
CN        200947127 Y   9/2007
(Continued)

OTHER PUBLICATIONS

International Search Report dated Nov. 15, 2012 for Application No. PCT/CN2012/071770.
(Continued)

*Primary Examiner* — Akm Enayet Ullah
(74) *Attorney, Agent, or Firm* — Ladas & Parry LLP

(57) ABSTRACT

Disclosed are a high-density fiber connector and an assembly method thereof. The connector, adapted for use with a fiber adapter, comprises a connector casing, a ferrule, a spring and a boot, wherein the connector casing has a cross width of 2.5 mm to 4.5 mm. The connector casing comprises a front casing and a rear casing, which lock up one another to form a cavity. The tail of the connector casing is connected with a boot. On the connector casing are sequentially arranged a guide block and an elastic arm from the front toward the back. A fixed end of the elastic arm is oriented toward the tail of the connector, while a free end faces an insert end of the connector and includes a retaining bump. The ferrule 2 is fastened with the ferrule tailstock 3 and
(Continued)

penetrates through a through hole at the front of the connector casing. The spring is compressed between the ferrule tailstock and a thrust block formed by inner walls of the connector casing. The provided fiber connector has a significantly reduced cross width of between 2.5 mm and 4.5 mm at the engaging surface without, however, compromising the structural strength and utility functions, such that the fiber connector may be more densely installed.

12 Claims, 5 Drawing Sheets

(52) U.S. Cl.
CPC ....... *Y10T 29/4995* (2015.01); *Y10T 29/49927* (2015.01)

(58) Field of Classification Search
USPC ........... 385/78, 88, 133–135; 29/516, 525.03
See application file for complete search history.

(56) References Cited

U.S. PATENT DOCUMENTS

| | | | | |
|---|---|---|---|---|
| 5,465,313 | A | 11/1995 | Belenkiy et al. | |
| 6,250,817 | B1 | 6/2001 | Lampert et al. | |
| 6,464,402 | B1* | 10/2002 | Andrews | G02B 6/381 |
| | | | | 385/134 |
| 7,510,335 | B1* | 3/2009 | Su | G02B 6/3869 |
| | | | | 385/60 |
| 7,632,125 | B2* | 12/2009 | Irwin | G02B 6/3879 |
| | | | | 385/76 |
| 8,224,146 | B2* | 7/2012 | Hackett | G02B 6/3825 |
| | | | | 385/134 |
| 8,287,191 | B2* | 10/2012 | Nielson | G02B 6/406 |
| | | | | 385/69 |
| 8,308,498 | B2* | 11/2012 | Adams | G02B 6/3879 |
| | | | | 439/304 |
| 8,323,042 | B2* | 12/2012 | Lin | H01R 13/443 |
| | | | | 439/133 |
| 8,632,352 | B2* | 1/2014 | Wagner | H01R 13/5812 |
| | | | | 439/352 |
| 8,764,308 | B2* | 7/2014 | Irwin | G02B 6/3879 |
| | | | | 385/134 |
| 8,882,363 | B2* | 11/2014 | Dong | G02B 6/36 |
| | | | | 385/77 |
| 9,081,153 | B2* | 7/2015 | Li | G02B 6/36 |
| 9,116,306 | B2* | 8/2015 | Li | G02B 6/36 |
| 9,170,379 | B2* | 10/2015 | Yang | G02B 6/387 |
| 9,331,426 | B2* | 5/2016 | Adams | H01R 13/447 |
| 2006/0056779 | A1* | 3/2006 | Wang | G02B 6/4292 |
| | | | | 385/92 |
| 2009/0047818 | A1 | 2/2009 | Irwin et al. | |
| 2010/0291783 | A1 | 11/2010 | Chang | |
| 2010/0322583 | A1 | 12/2010 | Cooke et al. | |
| 2011/0081113 | A1 | 4/2011 | Janes | |
| 2012/0033922 | A1 | 2/2012 | Nakagawa | |
| 2013/0266266 | A1* | 10/2013 | Li | G02B 6/36 |
| | | | | 385/78 |
| 2013/0266272 | A1* | 10/2013 | Li | G02B 6/36 |
| | | | | 385/83 |
| 2016/0178848 | A1* | 6/2016 | Zhong | G02B 6/3803 |
| | | | | 385/56 |

FOREIGN PATENT DOCUMENTS

| | | |
|---|---|---|
| CN | 201413419 Y | 2/2010 |
| CN | 201464673 U | 5/2010 |
| CN | 10188165 * | 11/2010 |
| CN | 101881865 A | 11/2010 |
| EP | 0156397 A2 | 10/1985 |
| EP | 0935147 A2 | 8/1999 |
| EP | 0969299 A2 | 1/2000 |

OTHER PUBLICATIONS

Supplementary European Search Report dated Feb. 19, 2015 for Application No. EP 11 87 0138.
Supplementary Partial European Search Report dated Oct. 30, 2015 for Application No. EP 12 87 0319.
Espacenet English abstract of CN 101881865 A.
Espacenet English abstract of CN 201464673 U.
Espacenet English abstract of CN 200947127 Y.
Espacenet English abstract of CN 201413419 Y.

* cited by examiner

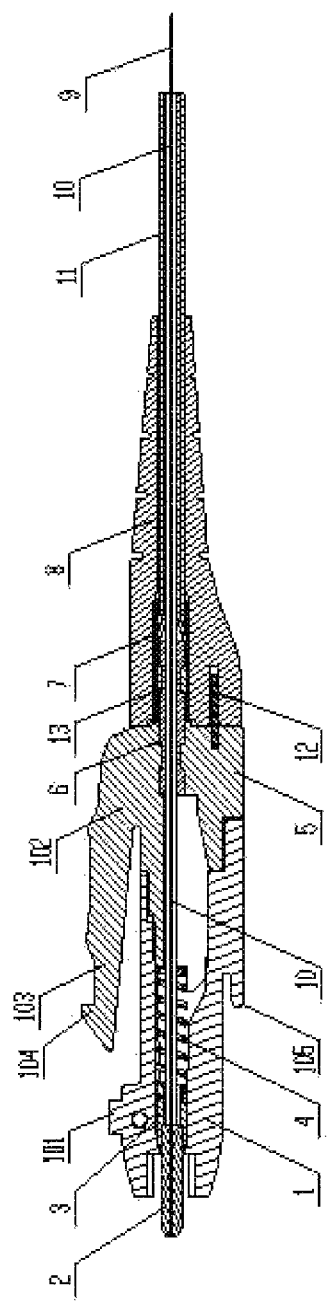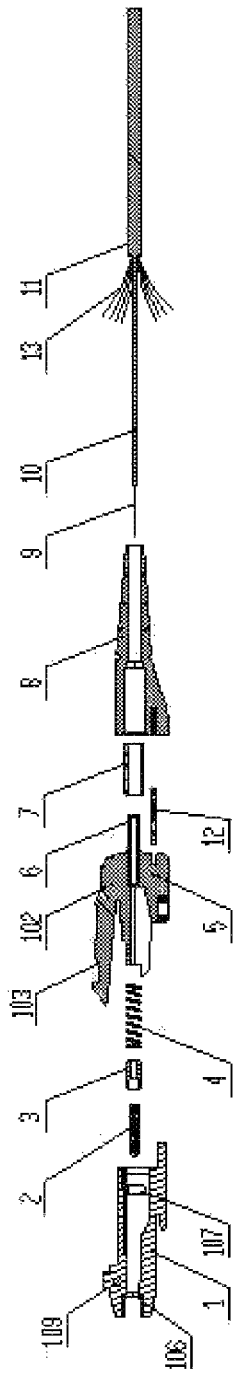
FIG 1
FIG 2

HIGH-DENSITY FIBER CONNECTOR WITH FRONT CASING DEFINING ENGAGEMENT RECESS AND REAR CASING INCLUDING HOOK ENGAGING WITH EACH OTHER

This application is a continuation of International Application No. PCT/CN2012/071770, filed Feb. 29, 2012, which claims priority to Chinese Patent Application No. 201210045948.X, filed Feb. 27, 2012, both of which are hereby incorporated by reference in their entireties.

TECHNICAL FIELD

The present disclosure relates to a fiber connecting device, and more particularly to a fiber connector suitable for high-density installation and an assembling method thereof.

BACKGROUND TECHNOLOGY

Fiber communication, which has grown into one of the main types of modern communications, plays a critical role in the modern telecommunication network. With the development of network technology, fibers are used widely as a transmission media for high-speed broadband digital communications. A fiber connector is a device serving for a detachable (removable) connection between fibers. Specifically, it precisely abuts the end surfaces of two fibers so that the light energy outputted from a transmit fiber can be maximally coupled to a receive fiber while minimizing the impact caused to a system due to its intervention into the optical link. Currently, common fiber connectors may be classified into, for example, a Ferrule Connector (PC), Subscriber Connector (SC), Straight Tip (ST), Lucent Connector (LC), D4, DIN, Miniature unit Coupling (MU) or Mechanical Transfer (MT) type, depending on the structure thereof.

The FC fiber connector, which was first developed by NTT from Japan, is externally strengthened by a metal sleeve and fastened by a turnbuckle.

The SC fiber connector, which has a cuboid casing, uses an inserting pin and a coupling sleeve of the same structure and dimension as those in the PC fiber connector, and may be fastened by a bolt.

The ST fiber connector is different from the SC fiber connector exposing its core, while the core of the SC connector is concealed within the joint.

The LC fiber connector, which was studied and developed by the famous Bell Labs, employs a modular Registered Jack (RJ) latch mechanism that is easy for operations. The inserting pins and the sleeve of the LC fiber connector have a width of 1.25 mm, nearly half of that of the common SC or FC fiber connector, and the area of the corresponding end surface is 4.5 mm*4.5 mm, thereby increasing the density of the fiber connectors installed in an optical fiber distributing frame. Currently, the LC connector has become dominant in the area of single-mode Small Form Factor (SFF), and its multi-mode applications are also rapidly expanding.

The Miniature Unit Coupling (MU) connector is so far the smallest single-core fiber connector in the world, which was developed by NTT based on the most commonly used SC fiber connector. It employs an aluminium pipe with a diameter of 1.25 mm and a self-holding mechanism. The MU connector is advantageous for its suitability for high-density installation, but still requires an end surface with an area up to 6.5 mm*4.5 mm.

With the large-scale progress of Fiber To The Home (FTTH), the fiber network is required to have a broader bandwidth and a larger capacity, and more and more fibers need to be connected into an optical access network. Correspondingly, hardware devices need to accommodate more connections, as a result of which, the fiber connectors need to be more densely installed and have a smaller volume. Particularly, the cross width of the end surface of the connector needs to be reduced as much as possible, so as to increase the installation density of the fiber connectors without demanding any changes to the physical volume of the existing equipment. However, the aforesaid structures of the conventional fiber connectors and the assembling processes thereof fail to meet these needs.

SUMMARY OF THE DISCLOSURE

The object of the disclosure is to provide a fiber connector suitable for high density installation and an assembling method thereof. The fiber connector as provided is different from the conventional fiber connectors in that the cross width of its engaging surface is significantly reduced without, however, demanding more structural strength, whereby fibers can be installed more densely.

The aforesaid object is realized by employing the following technical solutions:

According to one embodiment, a high-density fiber connector adapted with a fiber adapter is disclosed, which comprises: a connector casing, a ferrule 2 connected with a fiber, and a boot 8 connected with a tail of the connector casing. The connector casing is provided with an elastic arm thereon to lock up the fiber adapter, the elastic arm having a fixed end 102 oriented toward the tail of the fiber connector, and a free end 103 oriented toward an insert end of the fiber connector and comprising a retaining bump 104. When the connector is fitted into a corresponding fiber adapter, the retaining bump 104 on the free end 103 snaps fit the adapter. While the connector is to be removed, the free end 103 is pressed to disengage the retaining bump 104 from the fiber adapter. The fixed end 102 is oriented toward the tail of the connector while the free end 103 faces toward the insert end of the connector, such that the connector would not interfere with the adjacent fibers while being removed, thereby avoiding erroneous operations and damages to the adjacent fibers. Additionally, the free end may be, for example, noosed to conveniently remove the fiber connector, thereby addressing the problem that densely installed fiber connectors can hardly be inserted and removed.

The connector casing comprises a front casing 1 and a rear casing 5, which snap fit with one another to form a cavity, and is externally provided with a guide block 101 in the front to prevent reverse insertion. The ferrule 2 is fastened with a ferrule tailstock 3 and penetrates through a through hole 106 disposed at the front of the connector casing. A spring is compressed between the ferrule tailstock 3 and a thrust block 501 formed by inner walls of the connector casing.

In another aspect, an insert block 105 is provided at the bottom of the connector casing to engage with a corresponding groove arranged on the fiber adapter, preventing the fiber connector from shaking in a vertical direction.

In still another aspect, a shield 110 is disposed in the front of the connector casing to surround a projecting portion of the ferrule 2, the shield 110 having a curved interior surface.

Preferably, the connector casing has a cross width ranging from 2.5 mm to 4.5 mm.

In still another aspect, a hook 504 is provided at the side of the elastic arm to connect a plurality of elastic arms into one piece via a clamp 14.

The rear casing 5 comprises an insert portion having an inverted-U shaped cross section and including a hook 502 at both sides thereof to hook the front casing. The front casing 1 is provided with an engagement recess 107 on respective side wall to correspond to the hook 502, the hook 502 and the engagement recess 107 forming a snap-fit structure when the rear casing 5 is inserted into the front casing 1.

A positioning block 108 and a positioning slot 503 matching with each other are respectively arranged at the bottom of the front casing 1 and the rear casing 5.

The cavity comprises a front portion and a rear portion, the front portion being shorter than the rear portion. The front portion is configured for circumferentially accommodating the spring 4, while the rear portion for accommodating deformation of a bended fiber caused by retreat of the ferrule 2.

In another aspect, the rear casing 5 is fixed, at the tail, with a tail pipe 6 in communications with the cavity. The tail pipe 6 has an annular groove 601 and is enveloped by a metal pipe 7 that is subject to compression deformation.

The boot 8 is fixedly connected with the connector casing via the tail pipe 6 and an anti-spin insert 12.

A through hole 109 is provided on the connector casing, into which a rod-shaped connector is inserted to combine a plurality of the high density fiber connectors into one piece.

In another aspect, a through slot 505 is provided on the connector casing, into which a sheet-shaped connector is inserted to combine a plurality of the high density fiber connectors into one piece.

Preferably, the rod-shaped connector is a joint pin 15, which is in an interference fit with the through hole 109.

Preferably, the sheet-shaped connector is a combined anti-spin insert 16, which connects a plurality of connector casings and the boot 8 simultaneously.

Preferably, the sheet-shaped connector is a combined plate 17, which simultaneously connects a plurality of connector casings.

According to a second embodiment, the present disclosure provides a method for assembling a single-core high-density fiber connector, comprising:
1) fitting an end of a ferrule 2 into to a ferrule tailstock 3;
2) removing a coating (11) of a fiber at an insert end to maintain a tight buffer layer 10 and an aramid yarn layer 13 of a suitable length, and to expose a fiber core 9 of a suitable length;
3) directing the insert end of the fiber sequentially through a boot 8, a metal pipe 7, a tail pipe 6, a rear casing 5 and a spring 4; cleaning the fiber core 9 to remove a coating layer after; and inserting the fiber core 9 into the ferrule 2 through the ferrule tailstock 3;
4) heating to solidify an adhesive placed into the ferrule 2 beforehand so that the fiber is fixed to the ferrule 2;
5) fitting the ferrule 2 along with the ferrule tailstock 3 into the front casing 1 after the adhesive is solidified, such that the ferrule 2 projects from a through hole 106 at the front end of the front casing 1; mounting a spring 4; and inserting the rear casing 5 into the front casing 1 to engage therewith;
6) sheathing the tail pipe 6 with the aramid yarn layer 13 and then the metal pipe 7, and compressing the metal pipe 7 to deform so as to form a fixed connection therewith; and
7) mounting an anti-spin insert 12 on the rear casing 5, and inserting the anti-spin insert 12 and the metal pipe 7 into the boot 8 to complete the assembly of the connector.

In one aspect, Step 7) further comprises: gluing the coating 11 of the fiber to the boot 8.

In another aspect, Step 3) further comprises: directing an insert end of the fiber through a heat-shrinkable sleeve prior to the metal pipe 7, and accordingly, the method further comprises: after Step 6), covering the metal pipe 7 and the fiber coating 11 with the heat-shrinkable sleeve and heating the heat-shrinkable sleeve to fix it.

The present disclosure further discloses a method for assembling a multi-core high-density fiber connector, comprising:
1) arranging a plurality of assembled single-core fiber connectors closely in parallel, and directing a rod-shaped connector sequentially through a through hole 109 of each connector;
2) embedding a sheet-shaped connector into a through slot 505 of each connector; and
3) fitting a clamp 14 into a hook 504 disposed on the side of each single-core fiber connector to combine a plurality of elastic arms into one piece.

The high-density fiber connector as proposed in the present disclosure has a significantly reduced overall dimension, specifically, its engaging surface is reduced to a cross width of between 2.5 mm and 4.5 mm, which is not realized at the expense of structural strength and utility functions. Thereby, fiber connector can be installed much more densely.

BRIEF DESCRIPTION OF THE DRAWING

The present disclosure will be further described in detail below with reference to the accompanying drawings and embodiments.

FIG. 1 is a schematic diagram of a single-core fiber connector according to an embodiment of the present disclosure;

FIG. 2 is a breakdown view of FIG. 1;

Figure 3:
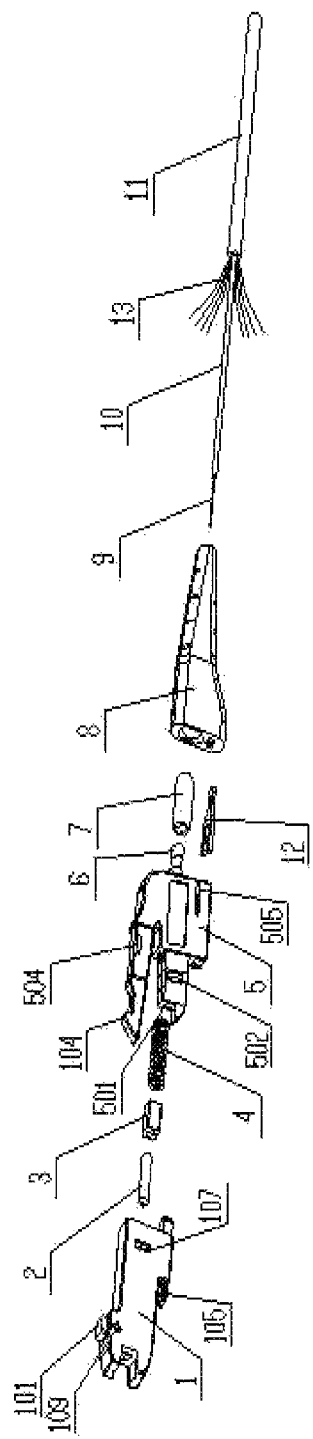
FIG. 3 is an exploded view of the single-core fiber connector according to the embodiment of the present disclosure.
Figure 4:
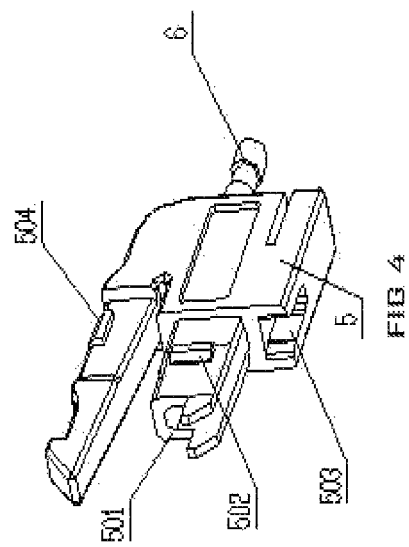
FIG. 4 is a schematic diagram of a rear casing of the single-core fiber connector according to the embodiment of the present disclosure.
Figure 6:
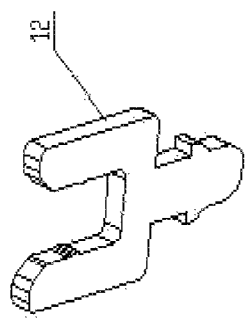
FIG. 6 is a schematic diagram of an anti-spin insert according to the embodiment of the present disclosure.
Figure 8:
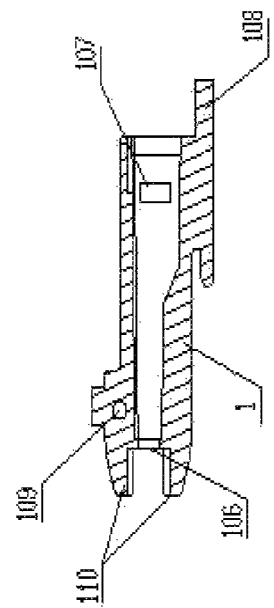
FIG. 8 is a section view of the front casing of the fiber connector according to the embodiment of the present disclosure.
Figure 5:
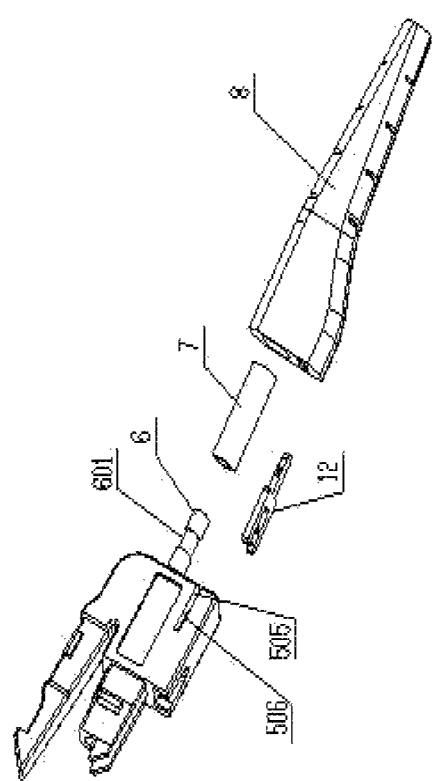
FIG. 5 is a schematic diagram of the rear casing of the single-core fiber connector according to the embodiment of the present disclosure, being assembled together with a boot.
Figure 7:
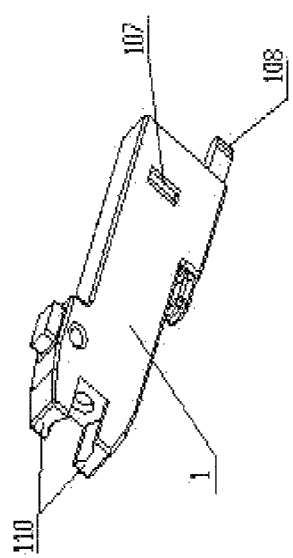
FIG. 7 is a schematic diagram of a front casing of the fiber connector according to the embodiment of the present disclosure.
Figure 9:
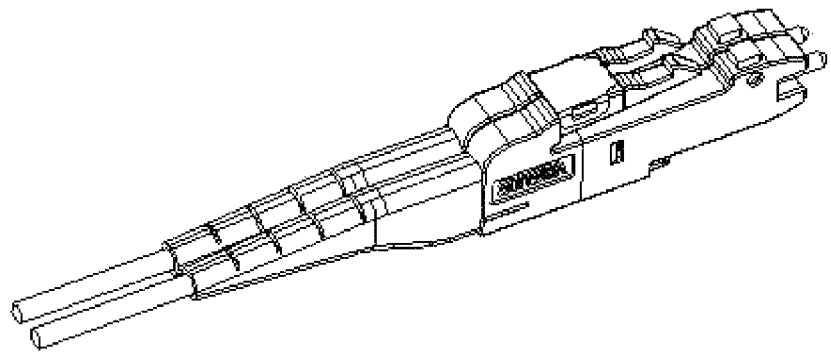
FIG. 9 shows a dual-fiber-connector structure according to an embodiment of the present disclosure.
Figure 10:
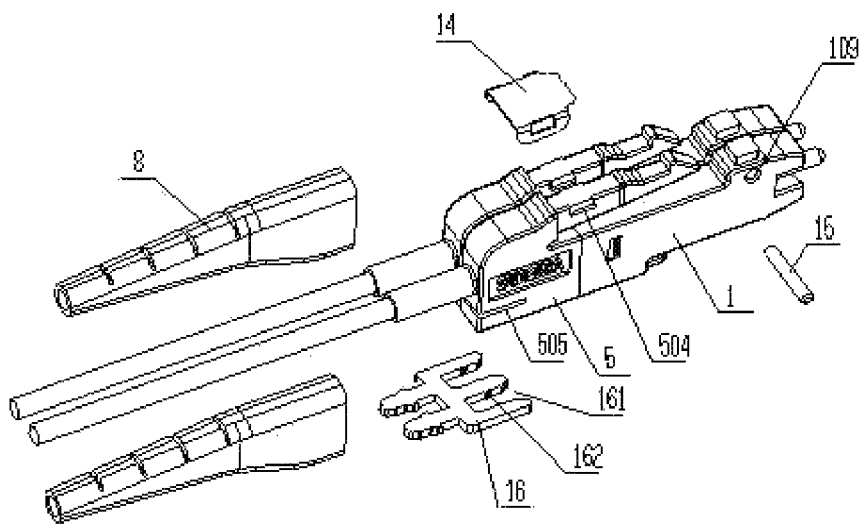
FIG. 10 is an exploded view of the dual-fiber-connector structure according to the embodiment of the present disclosure.
Figure 11:
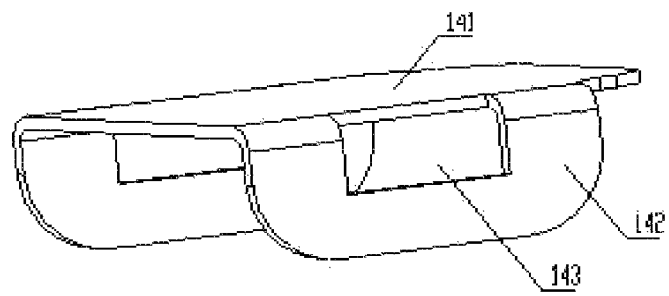
FIG. 11 is a schematic diagram of a clamp according to the embodiment of the present disclosure.
Figure 12:
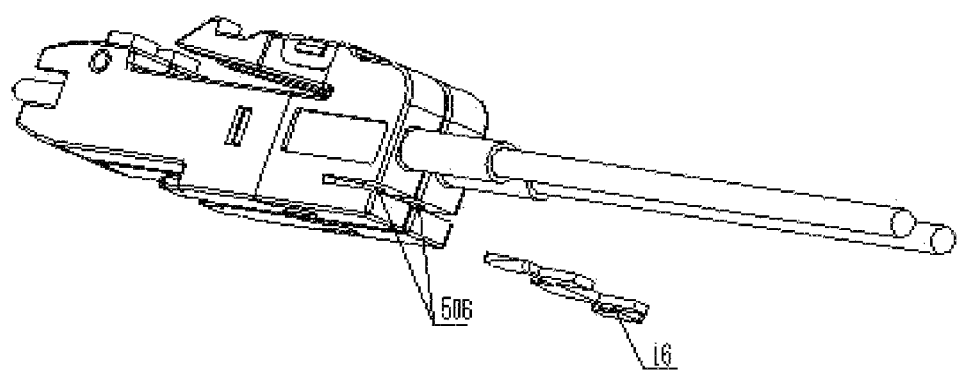
FIG. 12 is a schematic diagram of a tail though slot of the fiber connector according to the embodiment of the present disclosure.

In the drawing, the following reference numerals denote:
1: front casing; 2: ferrule; 3: ferrule tailstock; 4: spring; 5: rear casing; 6: tail pipe; 7: metal pipe; 8: boot; 9: fiber core; 10: tight buffer layer; 11: fiber coating; 12: anti-spin insert; 13: aramid yarn layer; 14: clamp; 15: joint pin; 16: combined anti-spin insert; 17: combined connecting plate; 101: guide block; 102: fixed end; 103: free end; 104: retaining bump; 105: insert block; 106: through hole; 107: engagement recess; 108: positioning block; 109: through hole; 110: shield; 501: thrust block; 502: hook; 503: positioning slot; 504: hook; 505: through slot; 506: positioning block; 121: notch; 122: retaining protrusion; 141: base plate; 142: lug; 143: engagement recess

DETAILED DESCRIPTION OF THE DISCLOSURE

FIGS. 1 to 8 illustrate a high-density fiber connector according to a particular embodiment of the present disclosure. The connector comprises a connector casing including a front casing 1, and a rear casing 5 which engages with the front casing. The rear casing 5 includes an insert portion, which has an inverted-U shaped cross section. On each of two external sides of the inverted-U shaped structure is formed a hook 502 to fasten the front casing. Correspondingly, the front casing 1 is provided with an engagement recess 107 on respective side walls. When the rear easing 5 is inserted into the front casing 1, the hooks 502 and the engagement recesses 107 will form a snap-fit structure. The inverted-U shaped structure is designed such that on the one hand, the hooks 502 on both external sides may be pressed towards each other during the insertion, and on the other hand, an elastic force is provided to enable the hooks 502 to snap fit the engagement recesses 107 when reaching the engagement recesses 107. A through hole 106 is arranged at the front of the front casing 1. The front casing 1 and the rear casing 5 fasten with each other to define a cavity, which includes a front portion and a rear portion, the front portion being lower than the rear portion. The front portion is used to accommodate a ferrule 2, a ferrule tailstock 3 and a spring 4. The spring 4 is arranged in the front portion circumferentially. The ferrule 2 has its tail fixed to the ferrule tailstock 3 and penetrates through the through hole 106 at the front of the connector casing. The spring 4 is compressed between the ferrule tailstock 3 and the front end of the inverted-U shaped structure of the rear casing 5. The front end of the inverted-U shaped structure serves as a thrust block 501, while the ferrule 2 and the ferrule tailstock 3 as a moving end. When fiber connectors are inserted into the front and rear ends of an adapter, the ferrules 2 abut on each other within the adapter, and then the spring 4 applies an elastic force onto each ferrule 2. The wider rear portion of the cavity is used to accommodate the deformation of the bended fiber caused by retreat of the ferrule 2. Consequently, when a fiber connector is inserted into an adapter, the fiber will not be broken or damaged due to insufficient space in the cavity to hold the deformed fiber caused by retreated ferrule 2.

An insert block 105, which is arranged at the bottom of the connector casing, may be inserted into a corresponding groove arranged at the fiber adapter to prevent the fiber connector from shaking in the vertical direction.

To compensate for the reduced thickness of the connector casing, a positioning block 108 and a positioning slot 503 matching therewith are respectively arranged at the bottom of the front casing 1 and the rear casing 5 in order to strengthen the snap-fit between the front casing and the rear casing, so that a tenon structure is formed after the snap-fit to enhance the connection between the front casing 1 and the rear casing 5.

To protect the portion of the ferrule 2 that projects from the connector casing, a shield 110 is disposed at a position of the front end of the connector casing to correspond to the projecting portion of the ferrule 2. The shield 110 has a curved interior surface such that the two sides of the shield 110 have a relatively large thickness, thereby ensuring a strong connection between the shield 110 and the front casing 1.

On the connector casing from the front toward the back are successively arranged a guide block 101 and an elastic arm. The guide block 101 not only guides the insertion of the connector into an adapter module, but also functions to prevent inverse insertion so as to ensure the fiber connector to be properly inserted. The elastic arm provided on the connector housing is intended to lock up a fiber adapter. A fixed end 102 of the elastic arm is oriented toward the tail of the connector, while a free end 103 is oriented toward an insert end of the connector and includes, at the very end of the elastic arm, a retaining bump 104 having a slanted surface. The retaining bump 104 is arranged such that when the fiber connector is inserted into a predesigned position of the adapter, it pops out into a corresponding groove of the adapter to lock up the adapter under the elasticity of the elastic arm itself. When the retaining bump 104 is to be removed, the elastic arm is pressed down so that the retaining bump 104 disengages from the groove of the adapter, and then is automatically removed under the elasticity of the elastic arm. The fixed end 102 of the elastic arm is arranged on the rear casing 5, while the free end 103 thereof faces toward the insert end of the connector, such that the connector would not interfere with the adjacent fibers while being removed, thereby avoiding erroneous operations and damages to the adjacent fibers. Additionally, the free end may be, for example, noosed to conveniently remove the fiber connector, thereby addressing the problem in the art that densely installed fiber connectors can hardly be inserted and removed. On the side of the elastic arm is provided with a hook 504. When a plurality of fiber connectors are used in parallel to form, for example, the dual-fiber-connector structure as shown in FIGS. 9-12, a clamp 14 may be used to combine the plurality of elastic arms into one piece. Preferably, the clamp 14 is formed by a stamped elastic metal sheet. The clamp 14 includes a base plate 141 made of an elastic material, and two lugs 142 formed by bending the two ends of the base plate 141. The two lugs 142 are provided with engagement recesses 143 to engage with the hooks 504 respectively. The hooks 504 and the engagement recesses 143 form a snap-fit structure, which makes it possible to move the elastic arms of two or more fiber connectors simultaneously, thereby reducing the difficulty in operations.

The rear casing is fixedly connected, at the tail, with a tail pipe 6 which is in communications with the cavity. The tail pipe 6 is typically made of metal and is formed integrally with the rear casing 5 by an injection molding process. The tail pipe 6 comprises an annular groove 601, and is enveloped by a metal pipe 7 which is subject to compression deformation. While assembling, an aramid yarn layer 13 of the fiber covers up the part between the tail pipe 6 and the metal pipe 7. The metal pipe 7 is pressed with a tool and deformed at the annular groove 601 to securely fix the fiber to the connector.

To protect the fiber, a boot 8 is disposed at the tail of the connector casing, fixedly connected with the connector casing by the tail pipe 6 and an anti-spin insert 12. The anti-spin insert 12 has one end inserted into the connector casing and the other end into the corresponding hole in the boot 8, so as to prevent the boot 8 from rotating around the tail pipe 6 and strengthen the connection between the boot 8 and the connector casing.

A through hole 109, or a through slot 505 or a combination thereof may be arranged on the connector casing to, along with a rod-shaped connector or a sheet-shaped connector, combine a plurality of fiber connectors into an integral multi-fiber-connector structure. A dual-fiber-connector structure as shown in FIGS. 9 to 12 is preferred. In this structure, two fiber connectors are fixedly connected by the cooperation of a rod-shaped connector 15 and a combined anti-spin insert 16. The rod-shaped connector 15 is in an interference fit with the through hole 109 at the front of the connector casing. The length of the rod-shaped connector 15 is equal to or slightly smaller than the sum of thicknesses of these two fiber connector casings. The rod-shaped connector 15, which can be knocked into the through hole 109 by a tool, is preferably made of metal such as an aluminium alloy or steel to ensure its excellent connection strength. it should be understood that the cross-section of the rod-shaped connector 15 is not limited to be circular. Instead, it may also be a rod-shaped connector with a rectangular or a polygonal cross-section. Accordingly, the cross-section of the through hole 109 needs to be rectangle or polygonal as well. A plurality of (e.g. two or more) the rod-shaped connectors may also be provided to achieve higher connection strength, and correspondingly a plurality of the through holes 109 need to be provided at each of the fiber connectors.

According to this embodiment, the rear casing is provided with a through slot 505 into which an anti-spin insert 16 is inserted as a sheet-shaped connector to connect two fiber connectors. Meanwhile, the anti-spin insert 16 is also connected with two boots 8. The combined anti-spin insert 16 is in an interference fit with the through slots 505. The combined anti-spin insert 16 has a cross width equal to or slightly smaller than the sum of thicknesses of the two fiber connectors. Further, to strengthen the cooperation between the combined anti-spin insert 16 and the through slots 505, a positioning block 506 is arranged within the through slot 505, and a notch 161 matching with the positioning block 506 is arranged at the corresponding position of the combined anti-spin insert 16. The positioning block 506 may be stuck in the notch 161 to effectively prevent the combined anti-spin insert 16 from being released from the through slots 505. Furthermore, a retaining protrusion 162 may be arranged at an inner side of the notch 161. With the retaining protrusion 162 resting against both sides of the positioning block 506, the combined anti-spin insert 16 is less likely to be disengaged from the through slots 505 while being used.

Figure 13:
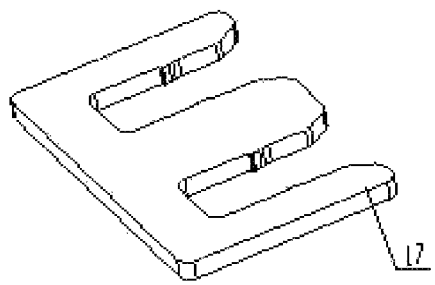
FIG. 13 is a schematic diagram of a combined connecting plate according to the embodiment of the present disclosure.

FIG. 13 shows a combined connecting plate 17 suitable for replacing the above combined anti-spin insert 16. The combined connecting plate 17 is not intended to be connected with the boot 8, but functions to connect the connector casings as a sheet-shaped connector.

It should be understood that a multi-fiber-connector structure may be formed using independently either a pair of a rod-shaped connector and a through hole, or a pair of a sheet-shaped connector and a through slot. More than two fiber connectors, preferably, an even number of fiber connectors, may be combined.

Hereinabove is disclosed the structure of the fiber connector according to the present disclosure. Accordingly, also disclosed in the present disclosure is a method for assembling a single-core fiber connector, which comprises:

1. fitting an end of a ferrule 2 into to a ferrule tailstock 3;
2. removing a coaling 11 of a fiber at an insert end to maintain a tight buffer layer 10 and an aramid yarn layer 13 of a suitable length, and to expose a fiber core 9 of a suitable length;
3. directing the insert end of the fiber sequentially through a boot 8, a metal pipe 7, a tail pipe 6, a rear casing 5 and a spring 4; cleaning the fiber core 9 to remove a coating layer; and inserting the fiber core 9 into the ferrule 2 through the ferrule tailstock 3;
4. heating to solidify an adhesive placed into the ferrule 2 beforehand so that the fiber is fixedly connected with the ferrule 2;
5. fitting the ferrule 2 along with the ferrule tailstock 3 into the front casing 1 after the adhesive is solidified such that the ferrule 2 projects from the through hole 106 at the front end of the front casing 1, and is received in the spring 4; and inserting the rear casing 5 into the front casing 1 to lock up therewith;
6. sheathing the tail pipe 6 with the aramid yarn layer 13 and then the metal pipe 7, and compressing the metal pipe 7 to deform so as to form a fixed connection; and
7. mounting a connector plate 12 to the rear casing inserting the connector plate 12 and the metal pipe 7 into the boot 8 to complete the assembly of the connector.

If the connector casing is of a relatively small thickness, the fiber coating 11 may be glued to the boot 8 in the aforesaid Step 7.

If the connector casing has a relatively large cross width and the boot 8 has a sufficient thickness, a heat-shrinkable sleeve may also be arranged surrounding the metal pipe 7 and the coating 11 of the fiber to enhance the fixation. Accordingly, in Step 3, the insert end of the fiber is guided through the heat-shrinkable sleeve prior to the metal pipe (7). Besides, after Step 6, the heat-shrinkable sleeve covers the metal pipe 7 and the coating 11 of the fiber before being heated and secured.

By contrast, the method for assembling a multi-core fiber connector additionally comprises:

1. arranging a plurality of assembled single-core fiber connectors closely in parallel, and directing a rod-shaped connector sequentially through a through hole 109 of each connector;
2. embedding a sheet-shaped connector into a through slot 505 of each connector; and
3. fitting a clamp 14 into a hook 504 disposed on the side of each single-core fiber connector to combine a plurality of elastic arms into one piece.

The casing of the single-core fiber connector provided in the present disclosure may have a reduced cross width of between 2.5 mm and 4.5 mm, which is much smaller as compared with the existing connectors, thereby greatly increasing the installation density of the fiber connectors.

The present disclosure is hereinabove described in details with respect to the foresaid embodiments, but these embodiments should not be construed to limit the scope of the present disclosure. Any equivalent practices or modifications made within the spirit of the present disclosure should be considered to fall within the scope of the present disclosure.

We claim:

1. A high-density fiber connector for being adapted with a fiber adapter, comprising: a connector casing, a ferrule (2) connected with a fiber, and a boot (8) connected with a tail of the connector casing, wherein the connector casing is provided with an elastic arm thereon to lock up the fiber adapter, the elastic arm having a fixed end (102) oriented toward the tail of the fiber connector, and a free end (103) oriented toward an insert end of the fiber connector and the free end (103) comprising a retaining bump (104);

wherein the connector casing comprises a front casing (1) and a rear casing (5), which snap fit with one another to form a cavity; the rear casing (5) comprises an insert portion having an inverted-U shaped cross section and comprising a hook (502) at both sides thereof to hook the front casing (1), the front casing (1) is provided with an engagement recess (107) on respective side walls to correspond to the hook (502), the hook (502) and the engagement recess (107) forming a snap-fit structure when the rear casing (5) is inserted into the front casing (1), the rear casing (5) is fixed, at the tail, with a tail pipe (6) in communications with the cavity, the tail pipe (6) having an annular groove (601) and enveloped by a metal pipe (7) that is subject to compression deformation, a boot (8) is fixedly connected with the connector casing via the tail pipe (6) and an anti-spin insert (12).

2. The high-density fiber connector of claim 1, wherein the ferrule (2) is fastened with a ferrule tailstock (3) and penetrates through a through hole (106) disposed at the front of the connector casing; and wherein a spring (4) is compressed between the ferrule tailstock (3) and a thrust block (501) formed by inner walls of the connector casing.

3. The high-density fiber connector of claim 2, wherein a positioning block (108) and a positioning slot (503) matching with each other are respectively arranged at the bottom of the front casing (1) and the rear casing (5).

4. The high-density fiber connector of claim 3, wherein an insert block (105) is provided at the bottom of the connector casing to fit into a corresponding groove arranged on the fiber adapter, preventing the fiber connector from shaking in a vertical direction.

5. The high-density fiber connector of claim 1, wherein a guide block (101) is externally provided with in the front of the connector to prevent reverse insertion and a shield (110) is disposed in the front of the connector casing to surround a projecting portion of the ferrule (2), the shield (110) having a curved interior surface.

6. The high-density fiber connector of claim 4, wherein the connector casing has a cross width ranging from 2.5 mm to 4.5 mm.

7. The high-density fiber connector of claim 1, wherein a hook (504) is provided at the side of the elastic arm to connect a plurality of elastic arms into one piece via a clamp (14).

8. The high-density fiber connector of claim 7, wherein a through hole (109) is provided on the connector casing, into which a rod-shaped connector is inserted to combine a plurality of the high density fiber connectors into one piece.

9. The high-density fiber connector of claim 7, wherein a through slot (505) is provided on the connector casing, into which a sheet-shaped connector is inserted to combine a plurality of the high density fiber connectors into one piece.

10. The high-density fiber connector of claim 8, wherein the rod-shaped connector comprises a joint pin (15), which is in an interference fit with the through hole (109).

11. The high-density fiber connector of claim 9, wherein the sheet-shaped connector is a combined anti-spin insert (16), which connects a plurality of connector casings and the boot (8) simultaneously.

12. The high-density fiber connector of claim 9, wherein the sheet-shaped connector is a combined plate (17), which simultaneously connects a plurality of connector casings.

* * * * *